US009792086B2

(12) United States Patent
Johnston et al.

(10) Patent No.: US 9,792,086 B2
(45) Date of Patent: *Oct. 17, 2017

(54) SYSTEM AND METHOD FOR SPEECH-ENABLED ACCESS TO MEDIA CONTENT BY A RANKED NORMALIZED WEIGHTED GRAPH USING SPEECH RECOGNITION

(71) Applicant: Nuance Communications, Inc., Burlington, MA (US)

(72) Inventors: Michael Johnston, New York, NY (US); Ebrahim Kazemzadeh, Los Angeles, CA (US)

(73) Assignee: Nuance Communications, Inc., Burlington, MA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/960,912

(22) Filed: Dec. 7, 2015

(65) Prior Publication Data

US 2016/0085506 A1    Mar. 24, 2016

Related U.S. Application Data

(63) Continuation of application No. 12/573,448, filed on Oct. 5, 2009, now Pat. No. 9,208,776.

(51) Int. Cl.
*G10L 15/00* (2013.01)
*G10L 21/00* (2013.01)
(Continued)

(52) U.S. Cl.
CPC .......... *G06F 7/08* (2013.01); *G06F 17/30026* (2013.01); *G06F 17/30743* (2013.01);
(Continued)

(58) Field of Classification Search
CPC ............ G06F 17/30026; G10L 15/063; G10L 15/265; H04N 21/47214
(Continued)

(56) References Cited

U.S. PATENT DOCUMENTS 8,453,180 B2    5/2013  Barton et al.
9,208,776 B2*  12/2015  Johnston ........... G06F 17/30026
(Continued)

*Primary Examiner* — Farzad Kazeminezhad

(57) ABSTRACT

Disclosed herein are systems, methods, and computer-readable storage media for generating a speech recognition model for a media content retrieval system. The method causes a computing device to retrieve information describing media available in a media content retrieval system, construct a graph that models how the media are interconnected based on the retrieved information, rank the information describing the media based on the graph, and generate a speech recognition model based on the ranked information. The information can be a list of actors, directors, composers, titles, and/or locations. The graph that models how the media are interconnected can further model pieces of common information between two or more media. The method can further cause the computing device to weight the graph based on the retrieved information, wherein the weighted graph is further normalized to yield a normalized weighted graph to help with speech query searching of media content using speech recognition. The graph can further model relative popularity information in the list. The method can rank information based on a PageRank algorithm.

20 Claims, 9 Drawing Sheets

(51) Int. Cl.
*H04N 5/445* (2011.01)
*G06F 7/08* (2006.01)
*G06F 17/30* (2006.01)
*G10L 15/197* (2013.01)
*H04N 21/422* (2011.01)
*H04N 21/466* (2011.01)
*H04N 21/482* (2011.01)
*H04N 21/84* (2011.01)
*G10L 15/08* (2006.01)
*G10L 15/26* (2006.01)
*G10L 15/06* (2013.01)

(52) U.S. Cl.
CPC ........ *G06F 17/30784* (2013.01); *G10L 15/06* (2013.01); *G10L 15/08* (2013.01); *G10L 15/197* (2013.01); *H04N 21/42203* (2013.01); *H04N 21/4662* (2013.01); *H04N 21/4668* (2013.01); *H04N 21/4828* (2013.01); *H04N 21/84* (2013.01); *G10L 15/063* (2013.01); *G10L 15/265* (2013.01); *G10L 2015/0633* (2013.01); *H04N 5/445* (2013.01)

(58) Field of Classification Search
USPC ........................................................ 704/275
See application file for complete search history.

(56) References Cited

U.S. PATENT DOCUMENTS

| | | |
|---|---|---|
| 2004/0193426 A1 | 9/2004 | Maddux et al. |
| 2005/0033582 A1 | 2/2005 | Gadd et al. |
| 2008/0103907 A1 | 5/2008 | Maislos et al. |
| 2010/0023513 A1 | 1/2010 | Berkhin et al. |

* cited by examiner

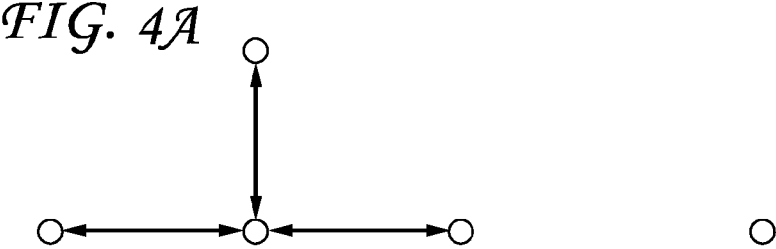
FIG. 4A
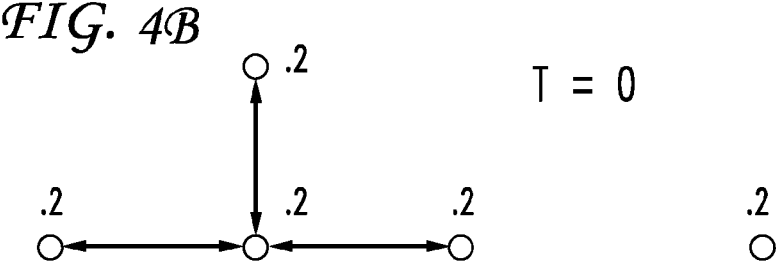
FIG. 4B    T = 0
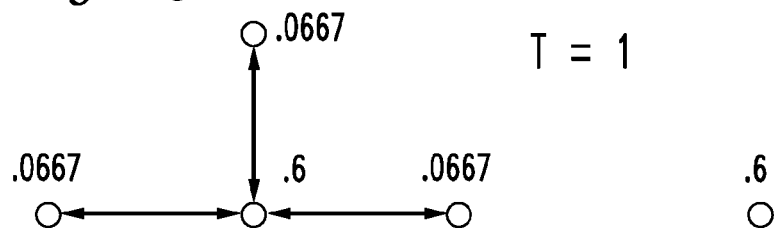
FIG. 4C    T = 1
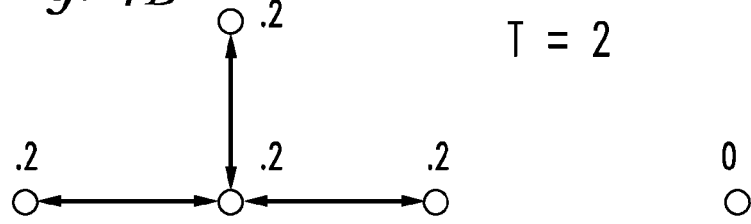
FIG. 4D    T = 2
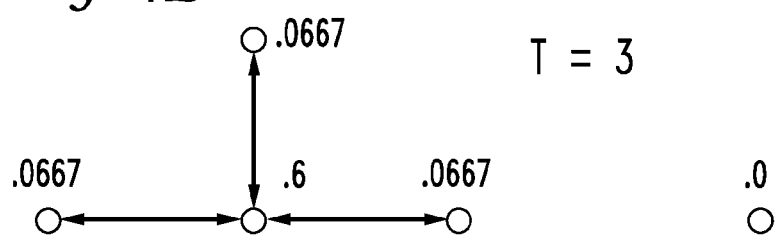
FIG. 4E    T = 3

SYSTEM AND METHOD FOR SPEECH-ENABLED ACCESS TO MEDIA CONTENT BY A RANKED NORMALIZED WEIGHTED GRAPH USING SPEECH RECOGNITION

PRIORITY INFORMATION

The present application is a continuation of U.S. patent application Ser. No. 12/573,448, filed Oct. 5, 2009, the content of which is incorporated herein by reference in its entirety.

BACKGROUND

1. Technical Field

The present disclosure relates to searching media content and more specifically to generating improved speech recognition grammars for searching media content.

2. Introduction

Current technology allows for massive media libraries of thousands of videos, movies, songs, and other media on even a modest personal computer. In an online, on-demand video application, the amount of media can be exponentially higher. With such large quantities of media, traditional user interfaces are inadequate. Natural language interfaces provide one way for users to quickly locate a particular piece of media or a particular group of media. For example, a user can search for a particular movie by saying "I want to see that one war movie with Tom Hanks" or "What is the movie series that has 'Clear and Present Danger'?"

However, one approach known in the art typically train speech recognition systems based on large amounts of training data related to the media in the media library. One problem with this approach is that before wide-scale deployment of such systems, insufficient data is available for training Another problem with this approach is that as new actors, movie titles, song titles, directors, genres, etc. trickle in to the vernacular of the searchers, the trained speech recognition model is ill-equipped to handle these new terms and terms associated with the new items are not appropriately represented and will appear to be less popular. For example, many users search for a new, previously unknown actress who appears in a recent movie, but who has a name similar to that of another, more established actress. The prior art speech recognition model would be trained to recognize the more established actress, when in fact users are really saying the new actress's name. The rapid pace of introducing new actors, movies, songs, and other media only exacerbates this problem.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for generating a speech recognition model for a media content retrieval system. The method causes a computing device to retrieve information describing media available in a media content retrieval system, construct a graph that models how the media are interconnected based on the retrieved information, rank the information describing the media based on the graph, and generate a speech recognition model, which may be a hierarchical language model, based on the ranked information. The information can be a list of actors, directors, composers, titles, and/or locations. The graph that models how the media are interconnected can further model pieces of common information between two or more media. The method can further cause the computing device to weight the graph based on the retrieved information. The graph can further model relative popularity information in the list. The method can cause the computing device to rank information based on a PageRank algorithm iteratively until convergence. The method can further cause the computing device to update the speech recognition model based on additional retrieved information.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A illustrates a PageRank example with no damping;

FIG. 4B illustrates a PageRank example with no damping at time T0;

FIG. 4C illustrates a PageRank example with no damping at time T1;

FIG. 4D illustrates a PageRank example with no damping at time T2;

FIG. 4E illustrates a PageRank example with no damping at time T3;

DETAILED DESCRIPTION

This approach uses different types of information from online sources to weight speech recognition grammars to improve media content retrieval in the context of video on demand. The proliferation and dynamic nature of media content in online and other sources allow the grammars of speech queries to be weighted based on measures of an actor's or actress's popularity (or other popularity metrics) derived from a repository such as the Internet Movie Database (IMDB), a company directory, a social networking website, or other source, rather than or as a supplement to traditional training data collected from users of the system, which may be incomplete or infeasible to obtain.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
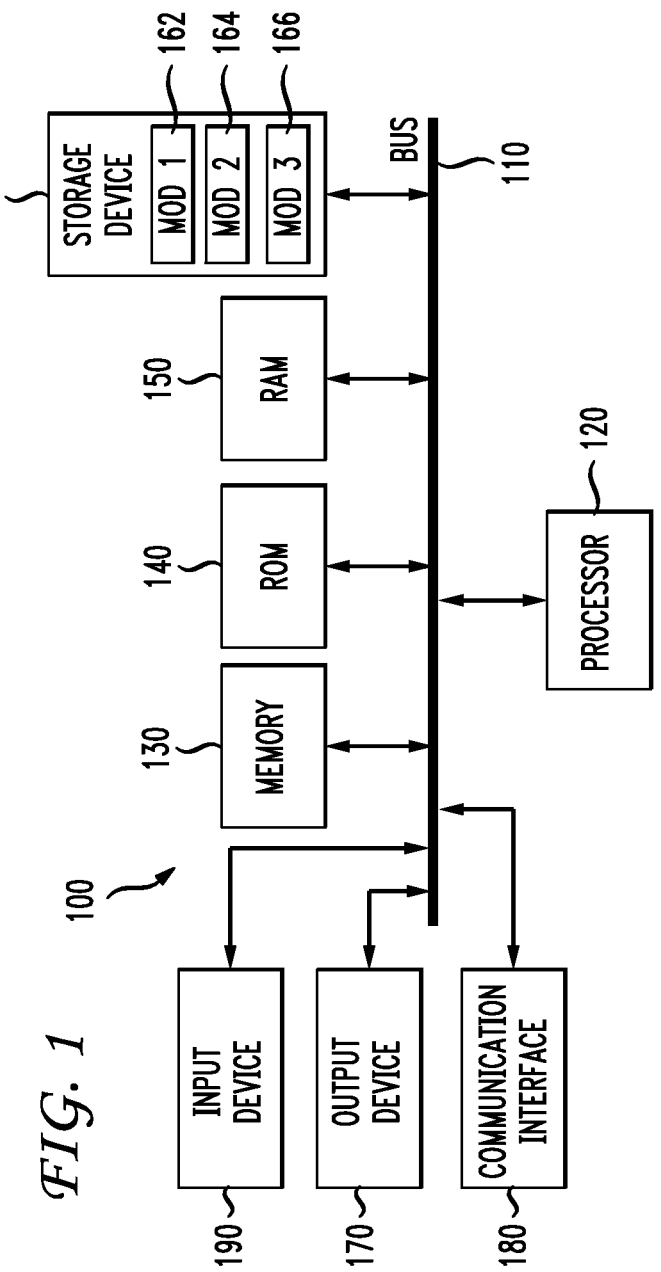
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
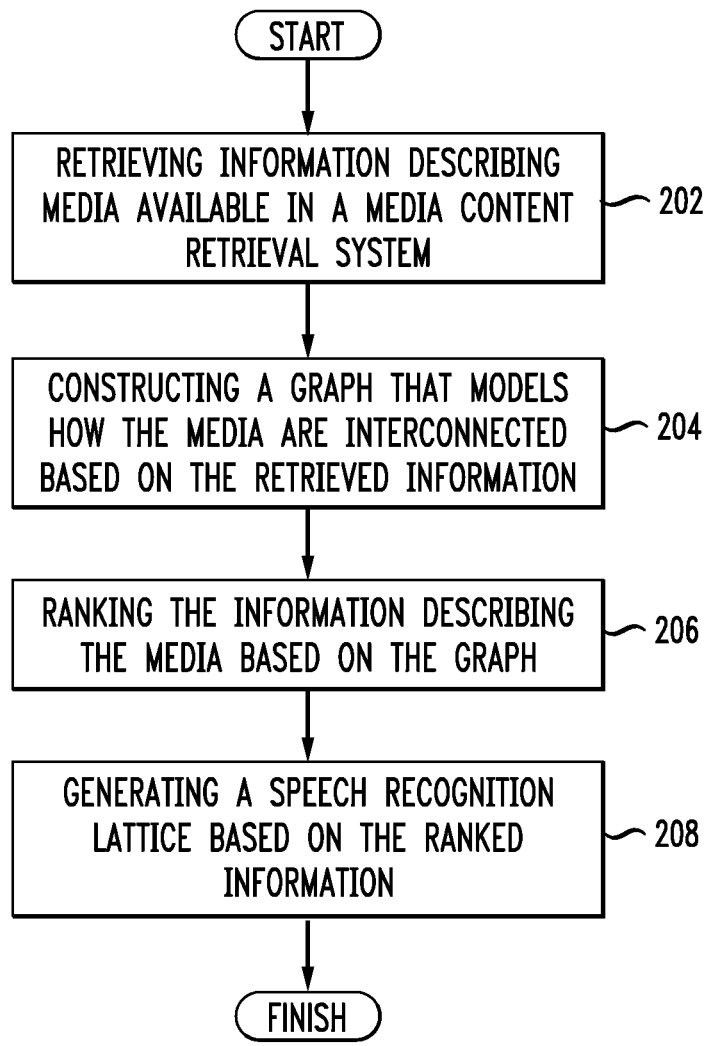
FIG. 2 illustrates an example method embodiment.

Having disclosed some basic system components, the disclosure now turns to the exemplary method embodiment shown in FIG. 2. For the sake of clarity, the method is discussed in terms of an exemplary system such as is shown in FIG. 1 configured to practice the method.

FIG. 2 illustrates an example method embodiment for generating a speech recognition model for a media content retrieval system practiced by a system 100. The system retrieves information describing media available in a media content retrieval system (202). The system constructs a graph that models how the media are interconnected based on the retrieved information (204), ranks the information describing the media based on the graph, and generates a speech recognition model, which may be a hierarchical language model, based on the ranked information. The information can be a list of actors, directors, composers, titles, and/or locations. The graph that models how the media are interconnected can further model pieces of common information between two or more media. The system can weight the graph based on the retrieved information. The graph can further model relative popularity information in the list. The system can rank information based on a PageRank algorithm iteratively until convergence. The system can update the speech recognition model based on additional retrieved information.

Online or other information sources can serve as measures of the relative popularity of particular actors in order to differentially weight different actor names in a speech recognition and understanding system. However, the principles disclosed herein are not limited to actors in a video-on-demand system. The principles herein can be applied to any other fluid database the contents of which change based on popularity or other dynamic metrics. In an exemplary solution, the system 100 constructs a graph of movies and actors based on the topology of an online information source such as the Internet Movie Database, or IMDB. In one variation, the system constructs the graph based on information from multiple sources, online or offline. The system can incorporate usage logs to at least partially determine popularity of particular persons or entities. The system runs a PageRank algorithm on the graph in order to determine a PageRank score for each actor. The system can use these PageRank scores directly in the creation of speech recognition grammar, or to build a rescoring transducer which rescores the graph output from a speech recognizer. However, rather than considering all actors equally probable for user speech input, the system weights the actors relatively based on their popularity and so overall the system makes less errors. Weights can be positive, zero, or negative. Similarly, the system can relatively rank titles, producers, directors, or any other media attribute. Other non-media domains are also within the scope of the disclosure. The system does not require the collection of training data, and can re-rank the recognition lattice without retraining as new popularity data become available. However, this approach does not entirely preclude the use of training.

Figure 3:
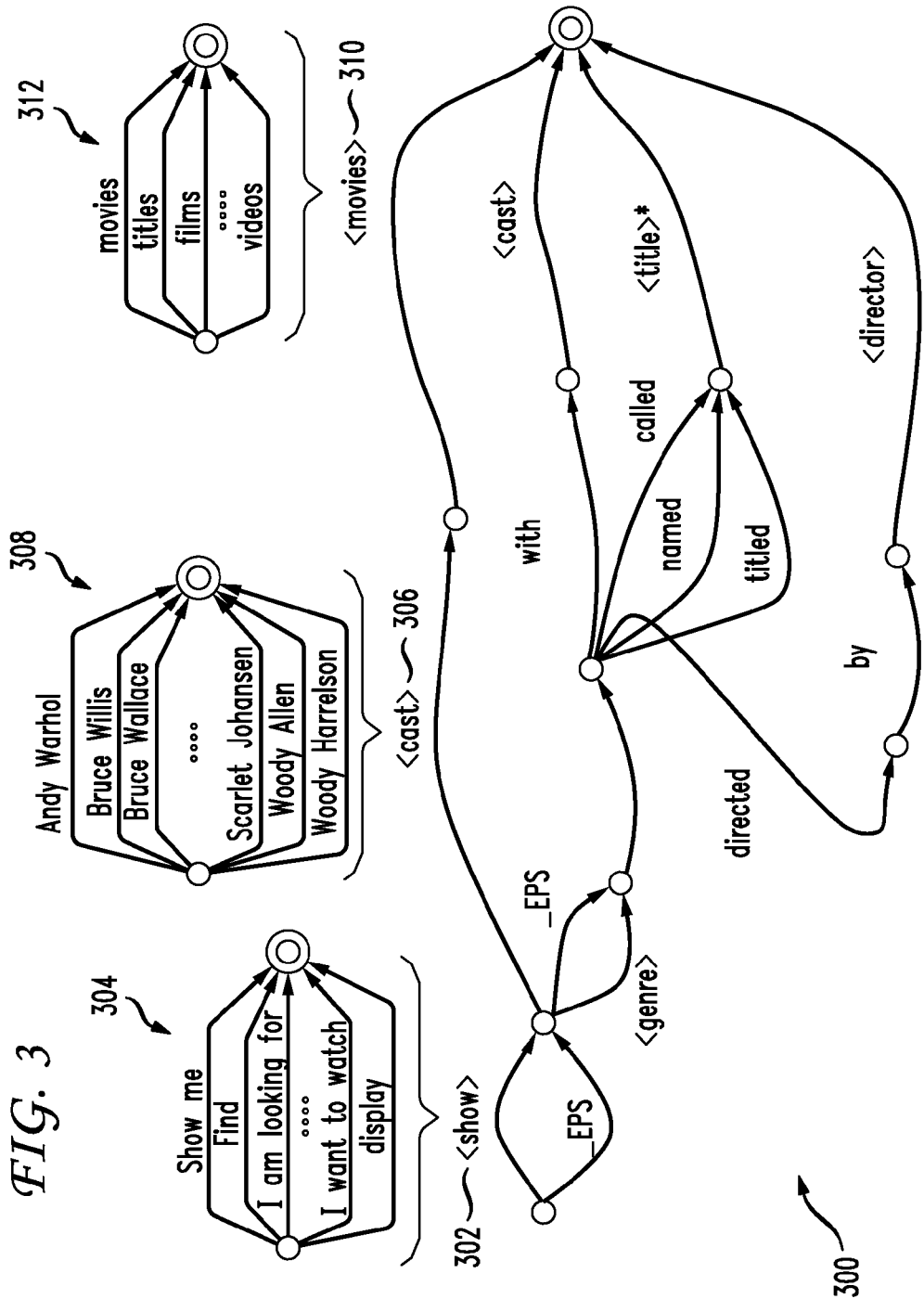
FIG. 3 illustrates an example hierarchical language model.

The system 100 can deal with unseen actors in the language model by using hierarchical language models (HLMs), an example 300 of which is shown in FIG. 3. HLMs are a superset of Class-Based Language Models, which allow the model to abstract over word classes, such as <show> 302, <cast> 306, <movies> 310, <genre>, <title>, <director>, and others. Thus, HLMs can extend information about occurrences of entities seen in training data to other unseen entities that are known to be in the same class. HLMs extend class-based language models by allowing a nested mixture of rule-based and statistical language models in a single grammar. For example, the HLM extends <show> 302 into a series of possibilities 304, such as "Show me", "Find", "I am looking for", "I want to watch", "display", and others. Similarly, the HLM can extend <cast> 306 into a list of popular actors and actresses 308, and <movies> 310 into various alternatives 312 such as movies, titles, films, videos, DVDs, etc. To do this, the system embeds individual rule-based and statistical language models in a top level grammar. The individual components of the resulting grammar can have different weightings or no weights at all. Thus, in one aspect, the system also normalizes some or all of the weights in a coherent way, especially when the weights come from different distributions.

With so much data available from online and offline sources, the system can estimate a particular actor's (or other attribute's) popularity in a number of ways. For example, the system can estimate popularity based on the number of hits on a web search, the number of movies an actor has been in, and/or the PageRank weight of actors in a social network created by linking actors who co-star together. The PageRank weights can be further based on the order of appearance or some other metadata.

The system can incorporate prior knowledge into speech recognition in two ways. First, the system can incorporate the knowledge at the level of the speech recognition grammar, or as post processing on the recognition output (i.e. graphs, lattices, or n-best lists). To convert prior knowledge to graph re-weighting factors, the system performs an optimization over linear scalings of PageRank values and movie counts.

First, the system constructs a graph structure that models who acts with whom, i.e. the system links two actors if they appear together in a movie. The system can construct graphs based on other features, such as common actors or directors. Then the system runs the PageRank algorithm until convergence, which in some situations can be roughly 50 iterations. Next the system performs speech recognition on a speech corpus using an unweighted grammar and high beam width, and outputs the graphs instead of the best path text string. The system uses the PageRank probabilities from the actor graph to create a finite state transducer (FST) that adjusts weights on particular graph transitions. This transducer is combined with the speech recognition model output using a finite state transducer composition operation. If necessary, the system can adjust graph weights by optimizing over the page rank damping factor and linear transformations of PageRank values.

In the resulting graph, the network structure determines the prominence of a node. The PageRank score of a node can be characterized as a probability distribution of a random surfer being at that node. The PageRank score can also depend on at least two factors: (1) the sum of the PageRank of incoming links and (2) a damping/smoothing factor to represent picking a random page instead of following a link. The PageRank algorithm logarithmically converges to a stable distribution after each iteration.

An exemplary algorithmic description of the PageRank algorithm is given as $$PR_t(p_i) = \frac{1-d}{N} + d \sum_{p_j \in L(p_i)} \frac{PR_{t-1}(p_j)}{|L(p_j)|} \qquad \text{Equation (1)}$$

where PRt represents nodes→[0,1]. For each iteration t, PR(x) maps a node in the graph to a probability that represents the likelihood of a random surfer being in that node. N represents the number of nodes in the graph. d represents a damping factor that characterizes the random surfer's choice of following a link versus choosing a random page. L represents nodes→nodes". L(x) maps a node x in the graph to the set of n nodes which link to it, where |L(x)| represents n, or the number of links to node x.

Figure 5A:
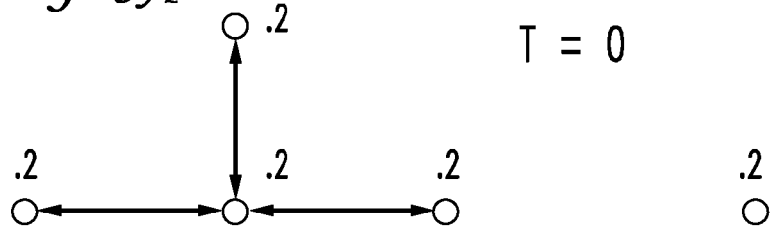
FIG. 5A illustrates a PageRank example with a damping value of 0.9 at time T0.
Figure 5B:
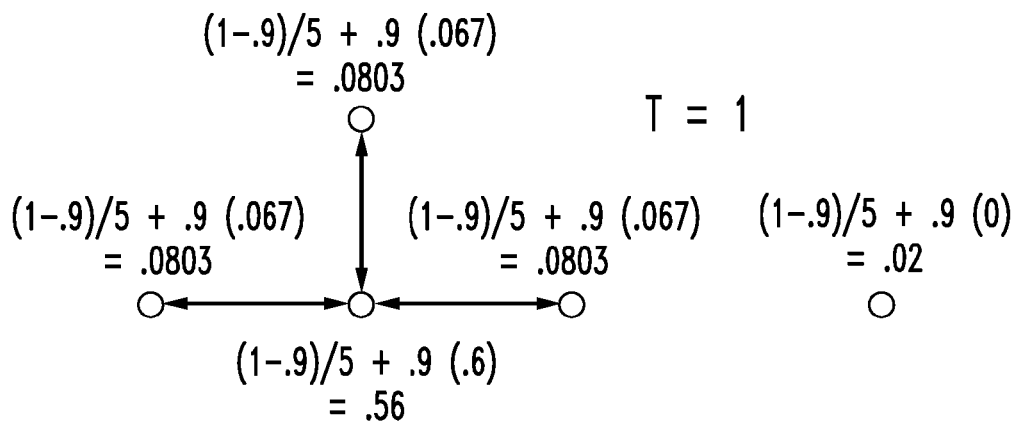
FIG. 5B illustrates a PageRank example with a damping value of 0.9 at time T1.
Figure 5C:
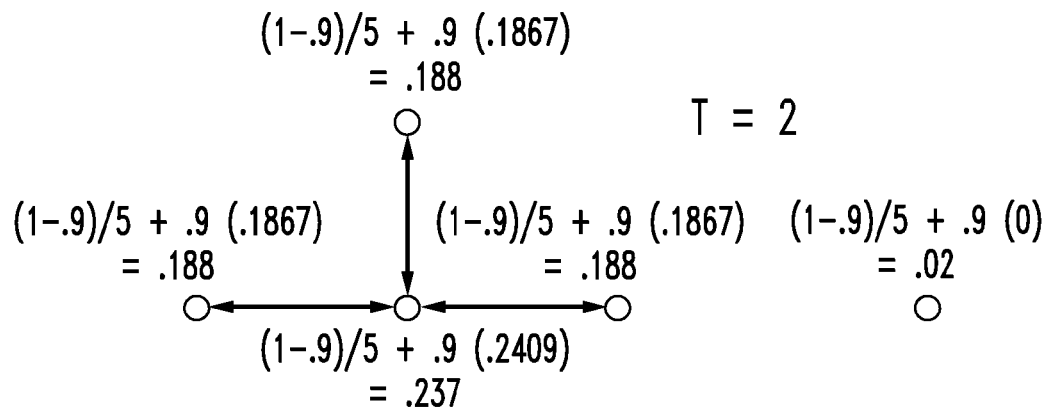
FIG. 5C illustrates a PageRank example with a damping value of 0.9 at time T2.
Figure 6:
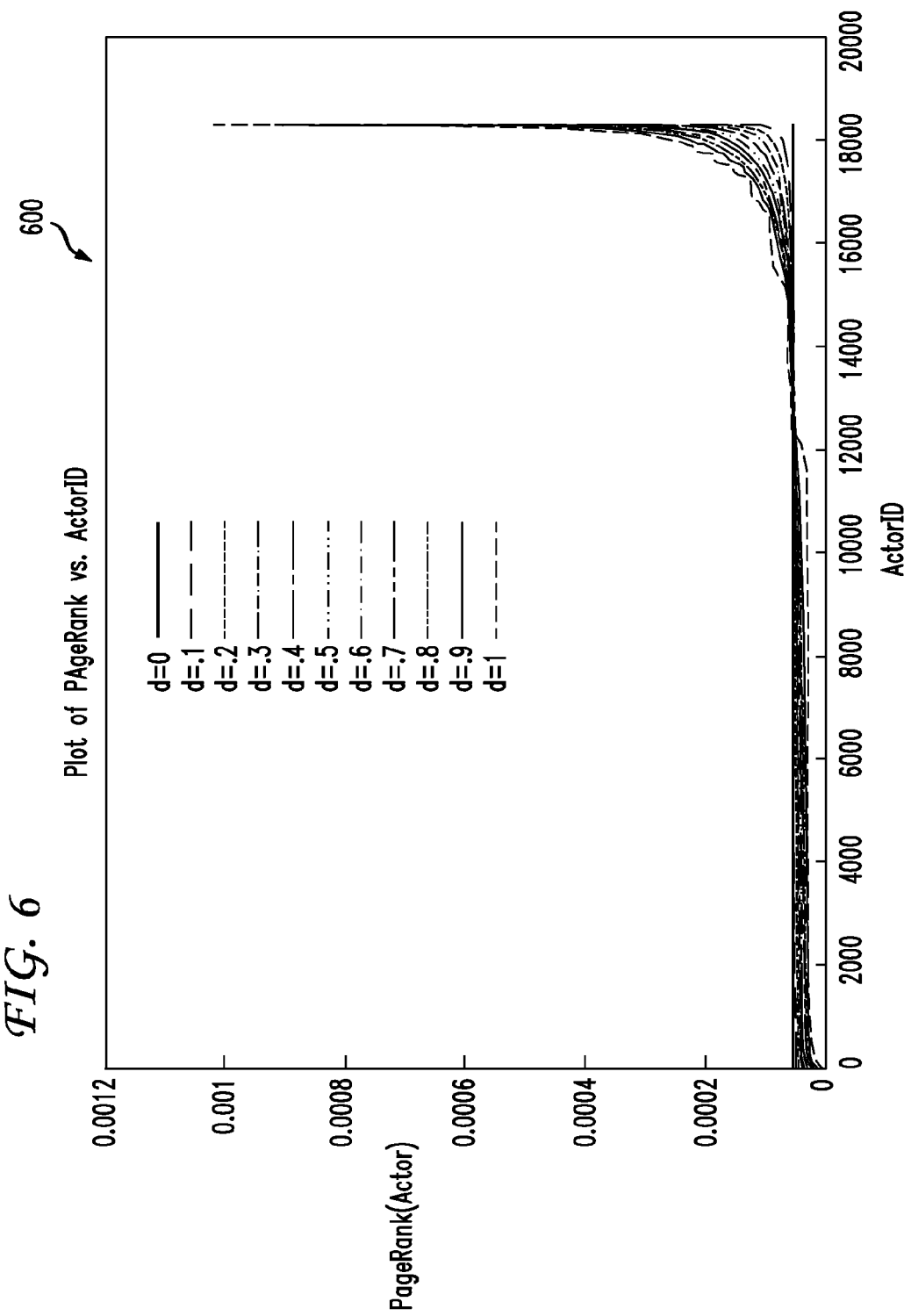
FIG. 6 illustrates example results data showing the effect of the damping factor on PageRank results.

FIG. 4A illustrates a PageRank example with no damping according to Equation (1). FIGS. 4B, 4C, 4D, and 4E illustrate PageRank examples with no damping at times T0, T1, T2, and T3, respectively, where d=1. FIG. 4E illustrates a PageRank example with no damping at time T3. FIGS. 5A, 5B, and 5C illustrate PageRank examples at times T0, T1, and T2, respectively, with a damping value of 0.9. FIG. 6 illustrates sample data showing the effect of the damping factor on PageRank results.

Figure 7:
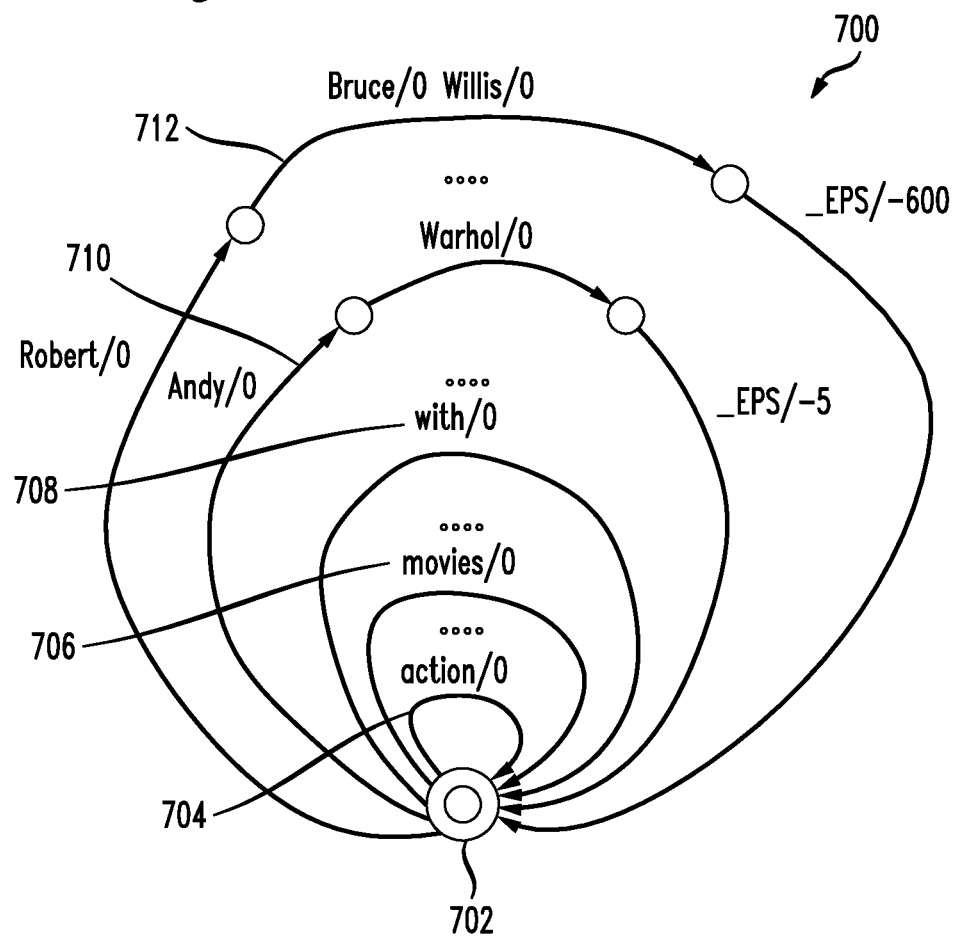
FIG. 7 illustrates a sample graph rescoring machine.

FIG. 7 illustrates a sample finite-state graph rescoring machine 700. The finite state machine 700 includes paths 704, 706, 708, 710, and 712 which lead back to a central state in the finite state machine 700. The finite state graph rescoring machine 700 removes cost from particular paths in the speech recognition lattice, represented by costs as labeled for each path. The best path is given by the path with the lowest total cost. In combination with a finite state composition tool, the finite state machine 700 does not impact weights on arcs in the lattice with words such as the genre 704, movies 706, with 708, etc. (note all those transitions have a weight of 0), but if in the lattice the finite state machine 700 finds names such as 'Robert De Niro' or 'Andy Warhol' the finite state machine 700 subtracts cost from those paths by introducing the negative weight. For example, path 712 shows that the finite state machine 700 subtracted −700 from the weight for the name 'Robert De Niro'.

Figure 8A:
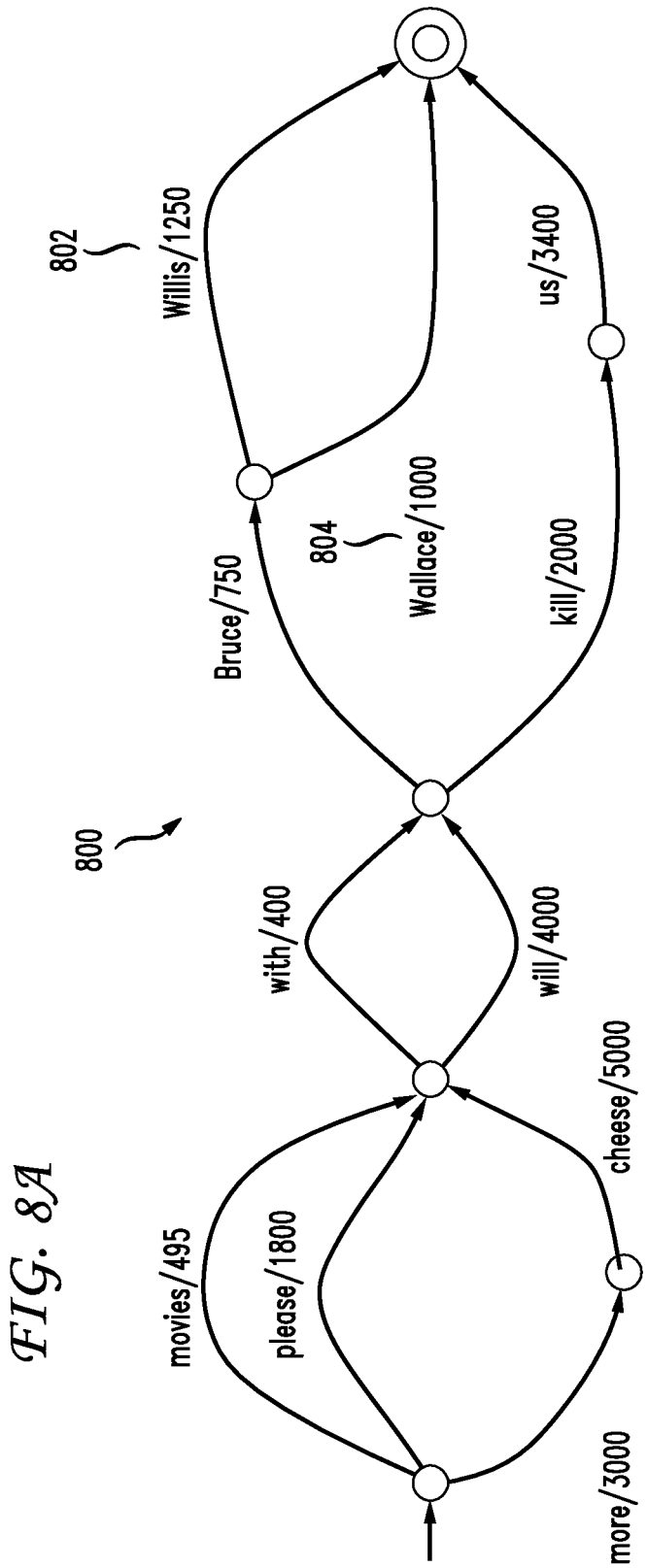
FIG. 8A illustrates an example graph prior to processing by the graph rescoring machine of FIG. 7.
Figure 8B:
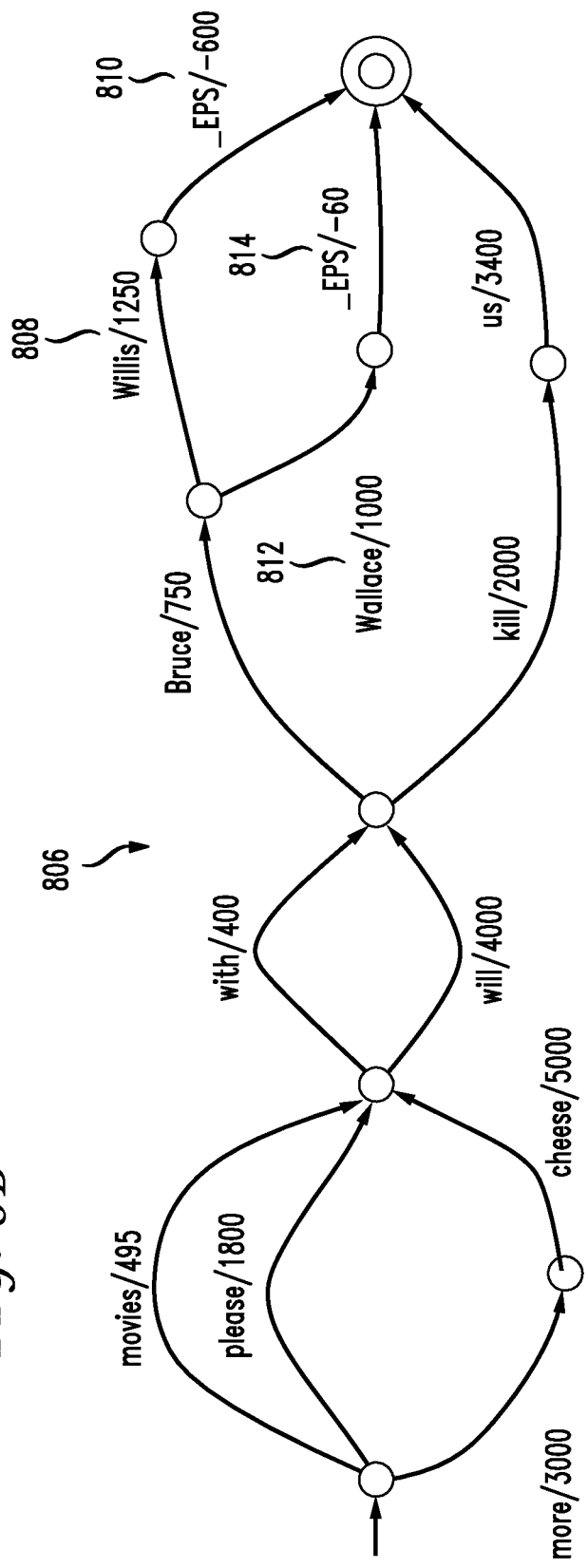
FIG. 8B illustrates an example graph after processing by the graph rescoring machine of FIG. 7.

FIG. 8A illustrates an example graph 800 prior to processing by the graph rescoring machine of FIG. 7. The graph 800 shows one path for Bruce Willis 802 and one path for Bruce Wallace 804 with their relative weights. FIG. 8B illustrates an example graph 806 after processing by the graph rescoring machine of FIG. 7. The EPS in FIG. 8B stands for epsilon and represents the 'empty' symbol that goes on an arc in the transducer when no symbols are consumed from the input. The path for Bruce Willis 808 includes a weightier EPS 810 than the EPS 814 for the path for Bruce Wallace 812, indicating that Bruce Willis is more likely than Bruce Wallace.

In one aspect, the system reweights factors in the graph based on PageRank and movie counts. The system uses linear scaling, estimated from data by running and re-running the experiment for scaling factors a and b and PageRank damping factor d as given by the following equation:

$$a*(\log(PR(\text{actor}))+b \quad \text{Equation(2)}$$

for damping factors d=0, 0.1, 0.2, 0.3, 0.4, 0.5, 0.6, 0.7, 0.8, 0.9, 1. In some experimental data, a recognizer based on prior art approaches recognized a set of utterances as "list Robert Pugh War movies", "comedy movies with this men", "Phil Morris comedy movies", "Dan Washington", "Michael Kane", and "Mickey Rooney", whereas a recognizer utilizing a rescored graph correctly recognized the same set of utterances as "list Robert Duvall movies", "comedy movies with Bruce Willis", "Bill Murray comedy movies", "Denzel Washington", "Michael Caine", and "Mickey Rourke".

The principles disclosed herein can apply to searches for other media as well, such as photos or audio. The system can rely on any similarity metric to make a link, such as similarity of acoustic features, the number of comments on a video, the general thrust of the comments, plot keywords, etc.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to local and network-available media libraries of movies, songs, books, etc. The principles herein can also be applied to directory assistance tasks. Those skilled in the art will readily recognize various modifications and changes that may be made to the principles described herein without following the example embodiments and applications illustrated and described herein, and without departing from the spirit and scope of the disclosure.

We claim:

1. A method comprising:
constructing, via a processor device, a media interconnection graph which models how media are interconnected by connecting disparate categories of the media;
weighting the media interconnection graph based on a popularity of the media, to yield a weighted graph;
normalizing the weighted graph, to yield a normalized weighted graph;
generating, via the processor device, a speech recognition model based on the normalized weighted graph;
receiving audible speech for searching media content; and
converting the audible speech to output a graph using the speech recognition model.

2. The method of claim 1, wherein the media interconnection graph links information comprising actors, directors, composers, titles, and locations.

3. The method of claim 2, wherein the constructing of the media interconnection graph is further based on common information in two media.

4. The method of claim 2, further comprising adjusting, prior to the normalizing, the weighted graph based on the common information.

5. The method of claim 2, wherein the media interconnection graph further models relative popularity of each piece of the common information.

6. The method of claim 1, further comprising ranking information used to build the media interconnection graph, wherein the ranking is performed using a web-page ranking algorithm.

7. The method of claim 6, further comprising running the web-page ranking algorithm until convergence.

8. The method of claim 1, further comprising updating the speech recognition model based on additional retrieved information.

9. The method of claim 1, wherein the media interconnection graph models relative respective popularity of each piece of the media.

10. The method of claim 1, wherein the speech recognition model is a hierarchical language model.

11. A system comprising:
a processor; and
a computer-readable storage medium having instructions stored which, when executed by the processor, cause the processor to perform operations comprising:
constructing a media interconnection graph which models how media are interconnected by connecting disparate categories of the media;
weighting the media interconnection graph based on a popularity of the media, to yield a weighted graph;
normalizing the weighted graph, to yield a normalized weighted graph;
generating a speech recognition model based on the normalized weighted graph;
receiving audible speech for searching media content; and
converting the audible speech to output a graph using the speech recognition model.

12. The system of claim 11, wherein the media interconnection graph links information comprising actors, directors, composers, titles, and locations.

13. The system of claim 12, wherein the constructing of the media interconnection graph is further based on common information in two media.

14. The system of claim 12, further comprising adjusting, prior to the normalizing, the weighted graph based on the common information.

15. The system of claim 12, wherein the media interconnection graph further models relative popularity of each piece of the common information.

16. The system of claim 11, the computer-readable storage medium having additional instructions stored which, when executed by the processor, result in the processor performing operations comprising ranking information used to build the media interconnection graph, wherein the ranking is performed using a web-page ranking algorithm.

17. The system of claim 16, the computer-readable storage medium having additional instructions stored which, when executed by the processor, result in the processor performing operations comprising running the web-page ranking algorithm until convergence.

18. The system of claim 11, the computer-readable storage medium having additional instructions stored which, when executed by the processor, result in the processor performing operations comprising updating the speech recognition model based on additional retrieved information.

19. The system of claim 11, wherein the media interconnection graph models relative respective popularity of each piece of the media.

20. A computer-readable storage device having instructions stored which, when executed by a computing device, cause the computing device to perform operations comprising:
constructing a media interconnection graph which models how media are interconnected by connecting disparate categories of the media;
weighting the media interconnection graph based on a popularity of the media, to yield a weighted graph;
normalizing the weighted graph, to yield a normalized weighted graph;
generating a speech recognition model based on the normalized weighted graph;
receiving audible speech for searching media content; and
converting the audible speech to output a graph using the speech recognition model.

* * * * *